Patented Jan. 25, 1944

2,339,914

UNITED STATES PATENT OFFICE 2,339,914

CHEMICAL COMPOUND

Arthur C. Cope, Bryn Mawr, Pa., assignor to Sharp & Dohme, Incorporated, Philadelphia, Pa., a corporation of Maryland No Drawing. Application November 29, 1940, Serial No. 367,773

6 Claims. (Cl. 260—472)

This invention relates to new esters of p-amino benzoic acid which have valuable properties for use as local anaesthetics. In general, the new compounds combine high effectiveness with relatively low toxicity and are relatively non-irritating. Naturally, some of the compounds are more effective, or less toxic, or less irritating, than others, but the group of compounds as a whole has important advantages for therapeutic use.

The new compounds, in some cases, have vasoconstricting properties, which is recognized to be an important advantage in local anaesthetics. They may be used by infiltration or injection, or for surface anaesthesia, for example, for application to the eye.

The new anaesthetics are amines, that is, bases, and in use will ordinarily be used in the form of salts, for example, as a hydrochloride, sulfate, sulfamate, tartrate, or other salt, as the free bases themselves are quite insoluble in water. The particular acid used in forming the salt is not of great importance, except that the salt should have sufficient solubility in water to be completely soluble in the concentrations used, which are usually of the order of 1% or less, and should be capable of proper crystallization, etc.

The new compounds of the invention are the esters of p-amino benzoic acid with alkyl ethanol amines in which the alkyl group is a secondary group, and has from 5 to 13 carbon atoms. These new compounds may be represented by the type formula

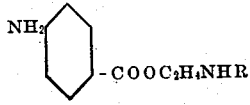

in which R represents a secondary alkyl group having from 5 to 13 carbon atoms, including the alicyclic groups such as the cyclohexyl group, methyl cyclohexyl group, etc. It will be noted that these compounds are secondary amines, that is, the amino group to which is attached the secondary alkyl group and the ethanol group is a secondary amino group, because two of the three hydrogens of ammonia have been replaced. To avoid confusion in terminology, in the expression "secondary alkyl amino" as used in this specification and the appended claims, the term "secondary" will modify the term "alkyl" only, with the understanding that in every case the amino group is secondary.

These compounds are readily prepared by reacting p-nitro benzoyl chloride, or other halide, or p-nitro benzoic anhydride, with a salt of a secondary alkyl amino ethanol, and reducing the resulting nitro benzoyl ester, catalytically or otherwise. The process of condensing the p-nitro benzoyl chloride with a salt of a secondary alkyl amino ethanol is described in my application Serial No. 344,593, filed July 9, 1940, and reference is made to that application for a detailed description of the process. The secondary alkyl amino ethanols, used as salts for the production of the p-nitro benzoyl esters, are advantageously prepared by condensing a ketone having 5 to 13 carbon atoms with monoethanolamine, and reducing, as described in my application Serial No. 344,163, filed July 5, 1940, and reference is made to that application for a detailed description of this process.

Because of availability of the intermediates, and convenience of purification, the p-nitro benzoyl esters of the secondary alkyl amino ethanols are advantageously prepared, as described in my said application Serial No. 344,593, by condensing p-nitro benzoyl chloride with the hydrochloride of the secondary alkyl amino ethanol; and when this procedure is followed, the ester is not produced as the base, but as the hydrochloride. However, if other p-nitro benzoyl halides, for example, the bromide, are used, or if the corresponding anhydride is used, other salts than the hydrochlorides are, or may be, produced. If the p-nitro benzoyl ester is produced as the hydrochloride, it may be subjected as the salt to reduction, catalytic or otherwise, to produce the corresponding salt of the corresponding p-amino benzoate, and the final p-amino benzoate of the secondary alkyl amino ethanol may be purified and used as the hydrochloride. On the other hand, if the p-nitro benzoate is produced as the salt with some other acid than hydrochloric acid, or is converted to the free base, it may be subjected to reduction in such form, in which case the final product will be the p-amino benzoate as the corresponding salt or as the free base; which may be purified and used as such. Further, if the p-amino benzoate is produced in the form of a salt with any given acid, it is readily converted to the salt of some other acid, by treatment with alkali to form the free base and subsequent neutralization by the desired acid. The free base may, of course, be converted to the salt with any desired acid by simple neutralization. The conversion of the salt of the p-amino benzoate with one acid to the salt with another acid, or to the free base, or the neutralization of the free base to form salts, involve procedures which are well known to those skilled in the art and require no detailed description herein.

The invention will be further illustrated by the following specific example, but it is not limited thereto.

EXAMPLE.—*Preparation of p-amino benzoic acid ester of 2-(1-methyl-heptyl)-amino ethanol.*—17.3 parts of 2-(1-methyl-heptyl)-amino ethanol (prepared, for example, as described in Example 1 of application Serial No. 344,163) are dissolved in 30 parts of chloroform and the solution is saturated with dry hydrogen chloride gas with cooling. 19.6 parts of p-nitro benzoyl chloride dissolved in 30 parts of chloroform are added and the mixture is heated under a condenser in a bath at 55–65° C. for 24 hours. The solvent is removed in vacuum, and the dry residue agitated with ether and filtered to remove p-nitro benzoyl chloride. In one case, the crude product weighed 34.5 parts, and on crystallization from absolute alcohol 32.0 parts of pure 2-(1-methyl-heptyl)-amino ethyl p-nitro benzoate hydrochloride were obtained, M. P. 155.5–156.5° C.

21.5 parts of this salt are ground to a fine powder and suspended in 1000 parts of water. A palladinized charcoal catalyst is introduced and the nitro compound reduced with hydrogen. After the reduction is complete, the catalyst is filtered off and the solution is concentrated in vacuum to one-fifth of its origin volume. During this process the crystalline product separates. The suspension is cooled, filtered and the product dried. It is not necessary to recrystallize the hydrochloride, which is the product produced, M. P. 159–160° C.

If, instead of the hydrochloride, the free base is desired, it is readily prepared by dissolving or suspending the hydrochloride in a small volume of alcohol, diluting with water, and treating with an excess of sodium carbonate. The free p-amino benzoic acid ester of 2-(1-methyl-heptyl)-amino-ethanol which is liberated is extracted with benzene, and obtained in this manner as the free base. If a salt with an acid other than hydrochloric acid is desired, it is simply necessary to add to a solution of the free base, e. g., in benzene, a sufficient quantity of any suitable acid to convert it into the neutral salt, as evaporation of the solvent and crystallization gives the pure salt. In this way, the sulfamate, melting point 120–121° C., the d-tartrate, melting point 70–80° C., the sulfate, melting point 209–210° C., the acetate, melting point 84–85° C., the salt with ethyl hydrogen sulfate, melting point 140–141° C., and the citrate, melting point 73–75° C., are readily prepared, as are other salts. The wide melting point range for the d-tartrate appears to result from the fact that this salt is a mixture of two diastereomers.

In the foregoing example, the reduction of the p-nitro benzoate to form the p-amino benzoate is described as carried on by suspending or dissolving the salt in water and subjecting it to hydrogenation using palladium supported on charcoal as a catalyst. This reduction may be carried out with the use of other solvents, or by suspending the salt in other liquids, for example, by using water, mixtures of water and alcohol, or other liquid. The use of mixtures of acetic acid and water, containing sufficient acetic acid so that the salt is relatively soluble in the mixture, is advantageous. Of course, other catalysts than palladium may be used, or chemical reduction may be used.

Other p-amino benzoic acid esters of secondary alkyl amino ethanols which are included in the invention and have valuable properties for local anaethetic uses include the p-amino benzoic acid esters of the following secondary alkyl amino ethanols:

| Secondary alkyl amino ethanol | M. P. of hydrochloride of p-amino benzoic acid ester |
|---|---|
| | °C. |
| 4-heptyl | 157–158 |
| 5-nonyl | 146–147 |
| 1-methyl-octyl | 161.5–162.5 |
| 1-methyl-nonyl | 143–144 |
| 1-methyl-cyclohexyl | 198–199 |
| 4-methyl-cyclohexyl | 182–183 |
| Cyclohexyl | 177–178 |
| 1,3-dimethyl-butyl | 165–166.5 |
| 1-methyl-hexyl | 140–142 |
| 2-isopropyl-6-methyl cyclohexyl | 218–219 |
| 1-methyl-butyl | 159–161 |
| 1-ethyl-propyl | 188.5–189.5 |
| 2,2,6-trimethyl-cyclohexyl | 200–201 |
| 4-(2,6-dimethyl-heptyl) | 154–156 |

I claim:

1. As new therapeutic agents, p-amino benzoic acid esters of secondary alkyl amino ethanols, in which the secondary alkyl group has from 5 to 13 carbon atoms.

2. As new therapeutic agents, p-amino benzoic acid esters of substituted amino ethanols of the formula

RNHC₂H₄OH in which R is an alicyclic group containing from 5 to 13 carbon atoms.

3. As new therapeutic agents, p-amino-benzoic acid esters of substituted amino ethanols of the formula

RNHC₂H₄OH in which R is an open chain secondary alkyl group having 5 to 13 carbon atoms.

4. The p-amino benzoic acid ester of 2-(1-methyl-heptyl)-amino-ethanol.

5. The p-amino benzoic acid ester of 2-(4-methyl-cyclohexyl)-amino-ethanol.

6. The p-amino benzoic acid ester of 2-(1-methyl-hexyl)-amino-ethanol.

ARTHUR C. COPE.